INVENTOR.
OTTO J. WOLFER
BY Edward H Lang
ATTORNEY

INVENTOR.
OTTO J. WOLFER
BY Edward H Surg
ATTORNEY

April 24, 1962

O. J. WOLFER 3,030,999

HIGHWAY TRUCK TIRE

Filed Dec. 29, 1958

INVENTOR.
OTTO J. WOLFER
BY

ATTORNEY

United States Patent Office 3,030,999
Patented Apr. 24, 1962

3,030,999
HIGHWAY TRUCK TIRE
Otto J. Wolfer, Park Ridge, Ill., assignor to The Pure Oil Company, Chicago, Ill., a corporation of Ohio
Filed Dec. 29, 1958, Ser. No. 783,328
2 Claims. (Cl. 152—209)

This invention relates to an automobile tire construction and, more particularly, to a tread and body construction for a tire adapted for use on both driving and rolling or steering (front) wheels of a vehicle. More specifically, this invention relates to a tire body combination lug or traction structure and rib or steering construction.

It is paramount that a good tire possesses long wearing qualities and provides for safe operation under a variety of conditions. A resilient rolling surface offers the least resistance to rolling movement if the contact surface is smooth, or without a tread design. However, ease of rolling movement, though important, is but one of a large list of requirements a modern truck tire must meet today. A truck must operate at low and high speeds, in all kinds of weather, with light loads and overloads, on various types of road surfaces and under severe stop-and-go conditions. It is known that maximum tread wear, on driving wheel positions, is provided by the use of transverse elements, called lugs. Maximum steering and traction qualities are known to come from the use of circumferential ribs and corresponding grooves in the tread. A lug tire provides more traction for off-of-the-road type of service, but has several drawbacks. A lug tire not being susceptible to circumferential groove cracking, is, however, subject to vibration, noise, and uneven wear on free rolling wheel positions. Also, a lug tire is devoid of side traction, i.e., ability to prevent skids or side slippage, and has poor steering qualities. On the other hand, a circumferential highway design rib tire provides the maximum rolling efficiency, steering qualities, resistance to side slippage and even wear, though, depending on the cord design, may still be prone to circumferential groove cracking. Overload conditions and high speed operation accentuate the poor qualities of each of these tread and cord body constructions.

It is highly desirable to have a tire which may be used on both driving and free rolling wheel positions to provide maximum tread life, traction under all highway conditions, and avoids tread groove cracking. This invention relates to a tire construction which incorporates and accentuates the good qualities of both the lug and rib tire features, while eliminating the poor qualities which ordinarily are inherent in such types of tire tread construction. The combination of features in the tire of this invention will provide improved vehicle steering and overall unit stability.

Although the tread design is important to tire utility and wear, the relationship of the tread to the tire body cord angle must also be considered. A transverse cord gives a resilient side wall construction and a longitudinal cord gives a stiff side wall. Consequently, the cord plies are now molded so that the layers of cords encircle the tire diagonally and each layer is on a bias with the adjoining layers. This invention provides a lug design at an angle which is closely related to the angle of the cord in the cord plies.

A primary object of this invention is to provide a tire that may be used on both driving and free rolling wheel positions to give maximum tread life, traction under all highway conditions and which avoids tread groove cracking.

Another object of this invention is to provide a tire having both lug and highway rib construction.

An object of this invention is to provide a tire tread having outer and center ribs with angular lugs set therebetween which gives maximum rolling and side traction, along with good steering qualities, long wear, freedom from noise, vibration, overheating, groove cracking and uneven tread wear.

A further object of this invention is to provide a truck tire having in combination with a tire body, angular or diagonal cords, lug elements parallel to a portion of the cords, a center rib and outer ribs which cooperate to give long, safe and even wear under all highway operating conditions.

These and further objects of the invention will be described or become apparent as the specification proceeds.

The invention is more clearly understood by reference to the drawings wherein.

Figure 1:
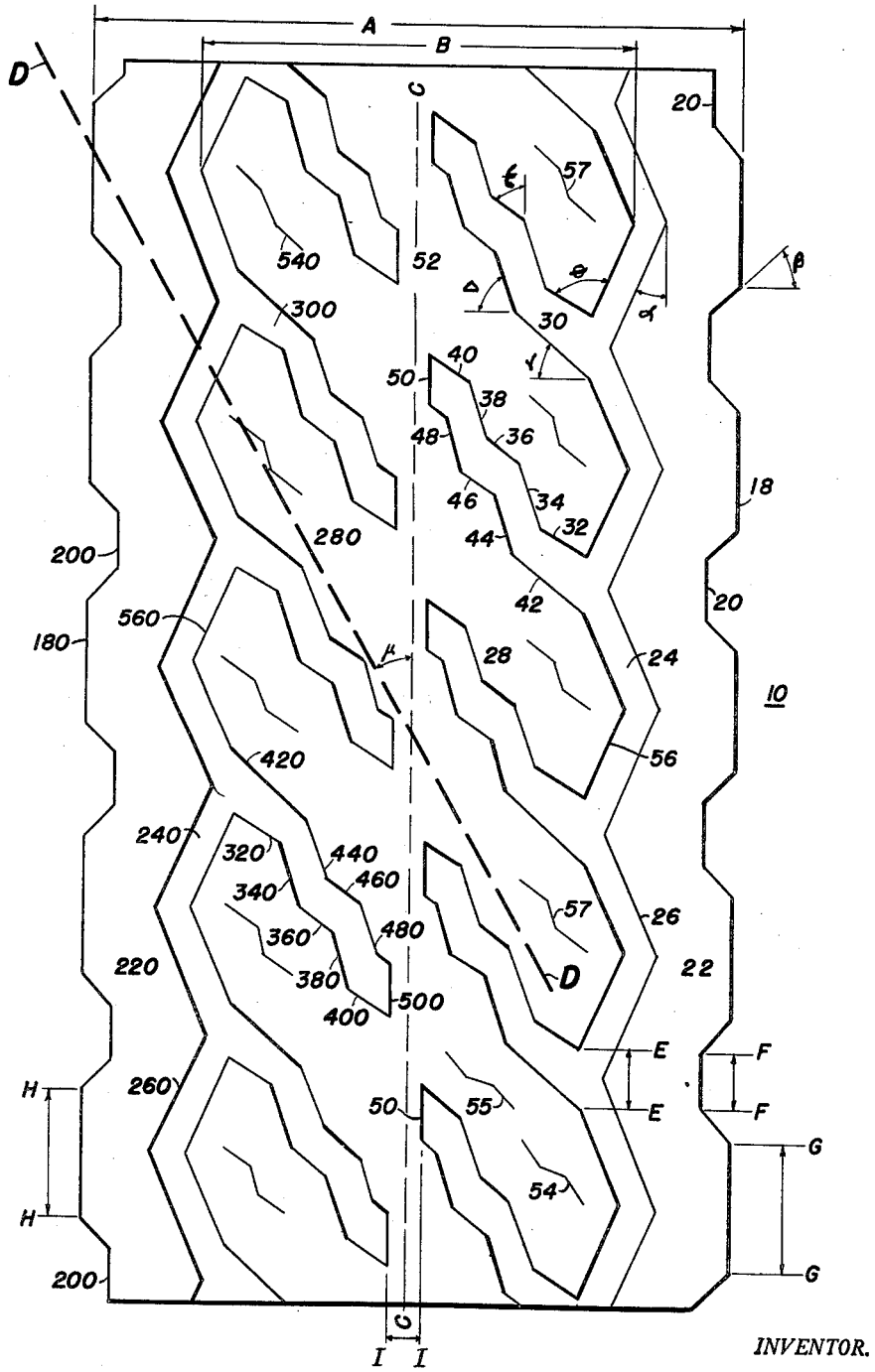
FIGURE 1 is a partial plane view of the tread portion of a tire incorporating the features of this invention.

Referring to the drawings, the structural relationship of the various parts of the tire of this invention is now described in detail. The tire body 10 is shown with side wall 12 and curb rub strip 14 on one side. The opposite rub strip is indicated at 140 (FIGURE 3) to differentiate one side of the tire from the other. Wherever possible in this description, this numbering system will be used for clarity. The tire beads are shown at 16 and 160. Connecting the rub strip 14 with the tread of the tire are a plurality of radial shoulders 18 and 180 separated by recesses 20 and 200. These recesses and shoulders terminate to form the outer edge of outer circumferential rib 22 on one side of the tire and outer circumferential rib 220 on the other side. The lateral distance across the tire tread is indicated at A. This distance for a size 10:00 x 20 deep tread truck tire is about 7.44 inches. A pair of zig-zag grooves 24 and 240 forms the inside edge of ribs 22 and 220, respectively. Each groove is composed of a plurality of straight sections 26 and 260 bisecting an angle of about 25° with the shoulders as indicated at angle $\alpha$. Grooves 24 and 240 are tapered, being about 8 cm. wide at the top and about 4 cm. wide at the bottom.

Between grooves 24 and 240 is lug area B composed of a plurality of angular lugs 28 and 280. These lugs are separated by a series of spaced angular internal grooves 30 and 300. Grooves 30 and 300 intersect with grooves 24 and 240, respectively, and at inward points of intersection of each pair of straight sections 26 and 260 to form a bifurcation. The angle of the internal top cord ply is indicated by dotted diagonal line D—D, being substantially parallel to or coincident with the longitudinal axis of each lug 28 and 280 and forming angle $\mu$ with center line C—C. Angle $\mu$ has a value of about 30° and line D—D (the line coincident with the top cord) forms an angle of about 60° with line A—A or with the transverse cross-section line shown in FIGURE 3. The side walls of internal grooves 30 and 300 are formed with a plurality of straight sections 32, 34, 36, 38 and 40 on one side and 42, 44, 46, 48 and 50 on the other side. A corresponding internal groove 300 is formed by straight sections 320, 340, 360, 380 and 400 on one side and 420, 440, 460, 480 and 500 on the other side as illustrated in detail in FIGURE 1. Straight sections 50 and 500 terminate short of the center line of the tread (C—C) to form central rib 52 therebetween. A plurality of sipes 54 and 540 are molded into the various lugs 28 and 280. 56 and 560 indicate the ends of lugs 28 and 280.

The angle of intersection of the radical shoulders 18 with the sidewall of recesses 20 is indicated by $\beta$. This angle is about 45°. The spacing of the bottom of one recess 20 with the spacing of the mouth of a groove 30 is indicated by comparative lines E—E and F—F. Similar spacing lines G—G are shown for the face of lugs 18 on one side and H—H on the other side of the tire. This points up the fact that the lugs 18 are not exactly opposite lugs 180. Comparative lines I—I show the longitudinal configuration of center rib 52 formed along the center line C—C. The angles from horizontal of the sides of an angular groove 30 are indicated at γ and Δ. In the preferred embodiment, γ has a value of about 40° and Δ about 70°. Also, the angular relationship of the opposite side of a groove 30 is indicated by angles ε and θ. Here ε will have a value of about 34° and θ about 90°.

Figure 2:
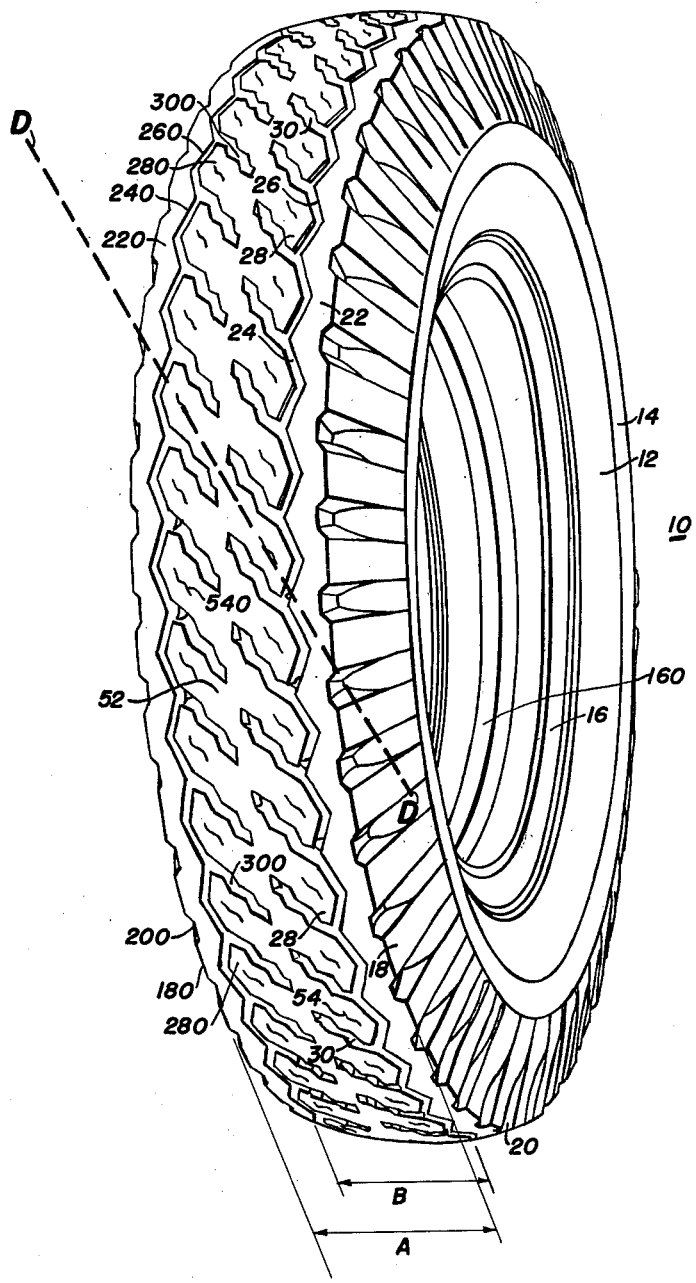
FIGURE 2 is an isometric view of a tire showing the tread arrangement as depicted in detail in FIGURE 1.
Figure 3:
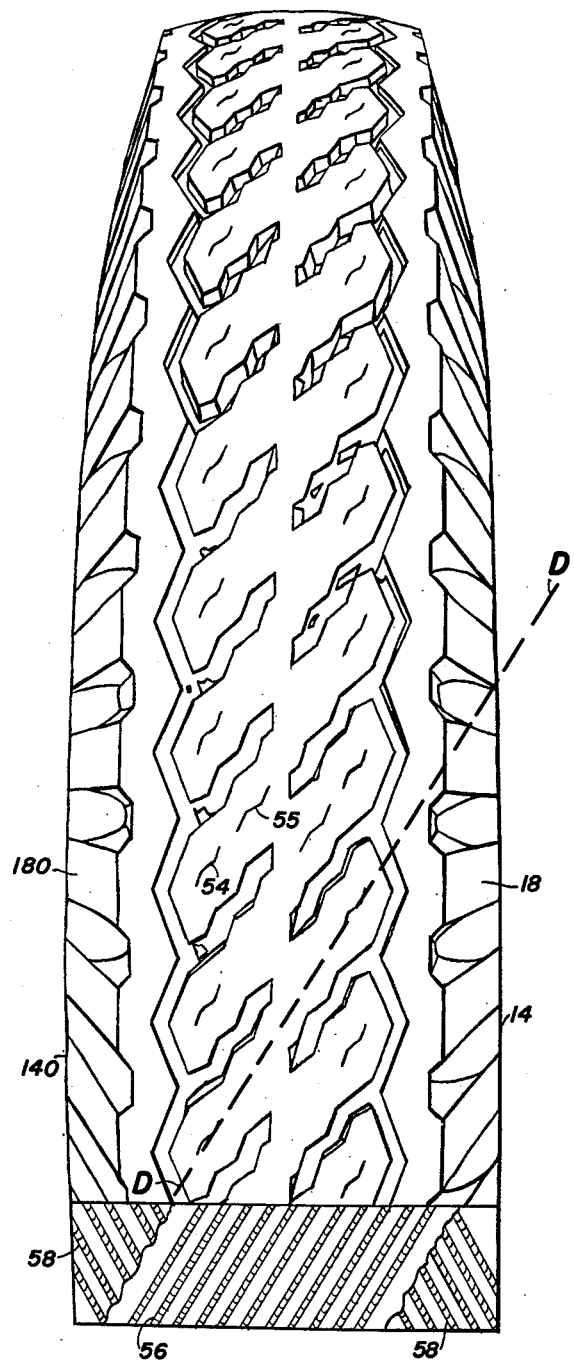
FIGURE 3 is a partial plan view of the tread showing part of the tread cut away to expose two sections of cord ply.

At 54 and 55 in FIGURES 1 and 3 are shown a pair of associated sipes in one lug member. This pattern and arrangement of sipes can be repeated throughout the tread design on both sides of the center line. Single sipes as indicated at 57 in FIGURE 1 and also in portions of FIGURES 2 and 3 may be used. The function of the sipes is to give resilience to the mass of rubber forming the lug member.

In FIGURE 3 the relationship of the various parts of the tire just described is further illustrated with a portion of the tread and side wall cut away to expose the tire body and the top layer of cord plies 56 shown parallel or coincident with line D—D. At each side, in FIGURE 3, are shown by further sectioning the next layer of cord plies 58. This construction places the lug members 28 and 280 coincident with the top layer of cords 56 and at an angle to the next layer of cords 58. Thus, the lugs are flexing during road contact from lug-end to the base at the center rib 52 in a direction which is at a bias to the angle of the cord plies.

The central tread area B of the tire of this invention replaces the circumferential ribs and grooves found in most highway-type truck tires. The central rib 52 and outer ribs 22 and 240 retain and provide steering qualities for the tire. The lug design elements 28 and 280 are placed parallel to or coincident with the top cord 56 of the tire which approximately parallels the angles of conventional rib side designs. Thus it is seen that each lug element contacts the road surface continuously from one end to the other along its length instead of perpendicular to its length. Also the lugs are always in contact with the road surface and the contacting surface always has the same amount of lug-contact and rib-contact.

This results in even lug wear as opposed to uneven lug wear for tires having lugs placed transverse the tread or transverse the central rib or central groove. The combination of ribs and lugs of the tire of this invention combines maximum steering qualities with maximum traction both parallel to the circumference of the tread (i.e., C—C) and transverse the circumference (i.e., A). At any point transverse the circumference of the tire the tread provides a plurality of bending moments in the edges of the elements which are presented to contact with the road surface. This results in a reduction in side slippage which is common in tires having a cross lug construction.

It has been found that another important feature of the foregoing tire tread design and construction is increased tire life and low tire tread running temperature. These results are attained, surprisingly enough, even under overload conditions. To illustrate these remarkable qualities of the tread construction of the tire of this invention, a series of tests were conducted on an indoor wheel test machine. The results of these tests showing average tire temperatures and tire growth are shown in Table I.

TABLE I

Indoor Test Wheel Results

[8.25-20 10 ply rating nylon truck tires; all runs—initial inflation 70 lbs. cold; room temp 100° speed-constant 40 m.p.h.]

| Accumulated Hours and Percent Tire Load | Tire No. | Average Tire Temperatures, degrees | | | | Tire Growth, percent | |
|---|---|---|---|---|---|---|---|
| | | Contained Air | Tread Crown | Tread Shoulder | Highest Reading | Cross Sect. | Sect. Ht. |
| 90%<br>2997#<br>7 Hrs. | 1<br>2<br>3 | 160<br>135<br>---- | 187<br>185<br>Av. 198 | 197<br>185<br>---- | 200<br>185<br>210 | ----<br>----<br>---- | ----<br>----<br>---- |
| 110%<br>3663#<br>23 Hrs. | 1<br>2<br>3 | 180<br>160<br>---- | 197<br>195<br>Av. 205 | 222<br>195<br>---- | 225<br>200<br>220 | ----<br>----<br>---- | ----<br>----<br>---- |
| 130%<br>4329#<br>167 Hrs. | 1<br>2<br>3 | 188<br>180<br>---- | 209<br>200<br>Av. 216 | 241<br>214<br>---- | 250<br>225<br>240 | 1.6<br>1.4<br>---- | 2.3<br>1.6<br>---- |

Total miles, approximately 7,000, no failure.

Tire Numbers 1, 2 and 3 were the same size and constructed of identical materials. Tire No. 3 incorporates 100 level tread design skid depth, whereas tires No. 1 and 2 incorporate premium skid depth. (100 level molded skid depth .47″; premium skid depth .59″.) Tire No. 1 is of a conventional 5-rib highway design. Tire No. 2 has the tread construction of this invention. Tire No. 3 is also a 5-rib design tire ordinarily used on front wheels or free-rolling trailer wheels, incorporating 100 level skid depth. These tests indicate that the tire No. 2 runs from 15° to 25° F. cooler than tire No. 1 with circumferential ribs and about 13° F. cooler than tire No. 3 at 90% load. Furthermore, the tire body was at a uniform temperature and had no "hot spots."

On raising the load to 10% overload, it is to be observed that tire No. 1 exhibited a 28° F. differential in temperature and the overall temperature of the tire increased by 25° F. Tire No. 2 had a body temperature increase of only 10° F. and the highest temperature reached was 25° F. lower than tire No. 1. Tire No. 3 showed a differential of 20° F. At 30% overload, a condition often found on the highways of today, tire No. 1 reached 250° F. which is an indication that the tire is about to fail and if the run were continued the tire would fail. Tire No. 2, however, exhibited an overall increase in temperature of only 5° F. over the results at 10% overload and showed no indication of failure. Tire No. 3 at 240° F., a 20° increase over the 10% overload results, is fast approaching the point of failure. Of equal significance is the percent of tire growth at these overload conditions. Reduced tire growth is a result of lower running temperatures and absence of "hot spots." Reduced tire growth contributes to improved tire tread life.

In Tables II and III following, a comparison is made of the general serviceability of tire No. 1 (Table II) with tire No. 2 (Table III) by means of an indoor wheel test.

hours has reached the danger point of 250° F. On the other hand, under these same conditions tire No. 2 is actually showing a decrease in temperature.

From the test results shown in Tables I, II and III, it is apparent that the structural features of tire No. 2 which are illustrated in the drawings produce a tire having greater serviceability and safety even under overload conditions. These test results emphasize the tread construction of this invention and the relationship of the

TABLE II

Tire No. 1—General Serviceability Tests

Type wheel, B of S 6' dia.
Type test, F-4
Rate load, 3330#
Percent overload as listed below
Inflation, 70#, 6.5 rim
Tire size—Ply, 8.25-20-10 PR
Type fabric, nylon
Wheel speed, 40 m.p.h.
Duro, 58
Room temp., 100° F.
Angle, 39°

O. diameter, 38.67
Weight, 68.50
Deflection, ins. .95
Ins. perimeter, 21.437
Tread width (ARC), 6.08
Cross section, 9.55
Radius, 15.250
Skid depth, .572
Defl. bulge, 9.92
Bead width, 1.312

| Hrs. Run | Total Hours | Percent Load | Load | Temperatures,[1] degrees | | | | | Running Measurements[2] | | | | Pre-Cut | |
|---|---|---|---|---|---|---|---|---|---|---|---|---|---|---|
| | | | | C. Air | CR. SP | CR. OPP | SH. SP | SH. OPP | C. Sec. | O. Dia. | Rad. | Inf. | In. | Growth, Percent |
| 7 | 7 | 90 | 2,997 | 160 | 190 | 185 | 200 | 195 | 9.64 | 38.93 | 15.25 | 84 | 4.00 | 0 |
| 16 | 23 | 110 | 3,663 | 180 | 200 | 195 | 220 | 225 | 9.66 | 39.00 | 15.25 | 86 | 4.10 | 2 |
| 24 | 47 | 130 | 4,329 | 185 | 210 | 205 | 240 | 235 | 9.70 | 39.05 | 15.25 | 87 | 4.10 | 2 |
| 24 | 71 | 130 | 4,329 | 185 | 195 | 200 | 230 | 230 | 9.70 | 39.05 | 14.75 | 85 | .440 | 10 |
| 24 | 95 | 130 | 4,329 | 190 | 210 | 215 | 240 | 240 | 9.68 | 39.08 | 14.50 | 84 | 5.30 | 32 |
| 72 | 167 | 130 | 4,329 | 195 | 220 | 220 | 250 | 250 | 97.70 | 39.08 | 14.0 | 79½ | 6.97 | 72 |

[1] C.Air=contained air; CR.SP=Crown serial position; CR.OPP=Crown opposite serial position; SH.SP=shoulder, serial position; SH.OPP=shoulder opposite serial position.
[2] C.Sec.=cross section; O.Dia.=outside diameter; Rad.=tread radius; Inf.=inflation (lbs.).
6680 total miles.
Tire analysis after test: No failure.
Tire growth: Cross section, 1.6%; section height, 2.3%.

TABLE III

Tire No. 2—General Serviceability Tests

Type wheel, B of S (6' dia.)
Type test, GSA
Rated load, 3330#
Percent overload as listed below
Inflation, 70#
Tire size—ply, 8.25-20-10 PR
Type fabric, nylon.
Wheel speed, 40 m.p.h.
Duro, 62
Room temp., 100° F.
Angle, 39°

O. dia., 38.57
Weight, 68.00
Deflection Ins., .93
Ins. Perimeter, 21.625
Tread width (ARC), 6.29
Cross section, 9.50
Radius, 15.00
Skid depth, .583
Defl. bulge, 9.77
Bead width, 1.218

| Hrs. Run | Total Hours | Percent Load | Load | Temperatures, degrees | | | | | Running Measurements | | | |
|---|---|---|---|---|---|---|---|---|---|---|---|---|
| | | | | C. Air | CR. SP | CR. OPP | SH. SP | SH. OPP | C. Sec. | O. Dia. | Rad. | Inf. |
| 7 | 7 | 90 | 2,997 | 135 | 185 | 185 | 185 | 185 | 9.60 | 38.76 | 15.00 | 78 |
| 16 | 23 | 110 | 3,663 | 160 | 190 | 200 | 190 | 200 | 9.60 | 38.80 | 15.00 | 82 |
| 24 | 47 | 130 | 4,329 | 180 | 200 | 200 | 220 | 225 | 9.66 | 38.85 | 15.00 | 84 |
| 24 | 71 | 130 | 4,329 | 180 | 200 | 190 | 220 | 220 | 9.63 | 38.84 | 15.00 | 82 |
| 24 | 95 | 130 | 4,329 | 180 | 210 | 200 | 210 | 210 | 9.65 | 38.87 | 15.00 | 82 |
| 72 | 167 | 130 | 4,329 | 180 | 200 | 200 | 200 | 210 | 9.63 | 38.84 | 15.00 | 79 |

7120 total miles.
Tire analysis after test: No failure.
Tire growth: Cross section, 1.4%; section height, 1.6%.

A comparison of the results of these tests indicates the following:

(1) At 90% load tire No. 1 exhibited a tire body temperature increase to as high as 160°, while tire No. 2, of this invention increased in body temperature to only 135°. Also, tire No. 1 showed evidence of uneven tread temperature while the tread temperatures of tire No. 2 were uniform.

(2) At 110% load, tire No. 1 increased in tread temperature to 225° F. while tire No. 2 ran at a maximum of 200° F.

(3) At 130% load, tire No. 1 is beginning to show signs of rapid increases in temperature and after 167 ribs and transverse lug members. It is known that the circumferential rib construction of tires No. 1 and 3, all other factors being equal, provides a relatively stable tire. The design construction incorporated into tire No. 2 improves overall tire stability. The cord angle $\mu$ has several functions. It can add or take away from the stability of the tire. The lower the cord angle the better the stability up to a point. With too low a cord angle, that is with the cords running practically circumferentially around the tire, tread groove cracking is promoted. A high cord angle, with the cords running practically transverse the circumference, produces a tire body of poor stability and also promotes radial cracking in the shoulder and sidewall areas. The principal feature of this invention is the attainment of the greatest possible tread and tire stability with maximum traction.

Other features of this invention as seen from these test results are the placement of the shoulder members 18 and 180 at slightly off-set positions on each side of the tire. This is shown by the space relationship of lines G—G to line H—H. This feature eliminates vibration, road noise and promotes even wear. Another feature is the placement of associated lug members on opposite sides of the center line of the tread area in line with each other so that there is formed a continuous diagonal lug-rib action. Still another feature is shown by the form of the leading or trailing end of each lug member 28 or 280 at the bifurcated groove area E—E. The arrangement of these edges at angle $\theta$ provides both side traction and forward traction in cooperation with the grooves 30 and 300 and grooves 24 and 240 around each lug member. Additionally, the space relationship of center groove 52 as indicated at I—I with groove ends 50 and 500 being alternated along the tread center retains a center rib action.

The relative size of the component parts of the tread may be varied without departing from the invention. The angular relationships are shown as illustrative and may be varied about 10° larger or smaller from those shown. Similarly, the dimensional relationship may be varied without departing from the invention. For a size 10:00–20 deep tread highway lug tire, as shown in FIGURE 1, the shoulders 18 and 180 will measure about 1.48" with the other dimensions being proportional on the same scale.

What is claimed is:

1. In a highway truck tire having a rubber tread and a plurality of layers of diagonally laid cord plies under said tread, the combination comprising a pair of outer circumferential ribs formed in said rubber tread, the outer edge of said ribs comprising a series of alternate shoulders and recesses, the shoulders on one side of said tread being opposite a portion of a corresponding recess on the other side of said tread, a pair of zig-zag grooves extending circumferentially around said tire to form the inner edges of said outer ribs, said circumferential grooves each comprising a plurality of angularly interconnected groove segments having alternate outwardly and inwardly facing angular junctions every other one of which is substantially coincident with the angle of said cord plies, a plurality of spaced zig-zag diagonal grooves extending inwardly from each of said outwardly-facing angular junctions of said circumferential grooves, said spaced zig-zag diagonal grooves terminating short of the center line of said tread, said spaced zig-zag grooves extending coincident with the top layer of cord plies with the angle of deflection from said center line being spaced to form continuous transverse lug members across said tire between said outer ribs, and the point of intersection of each spaced zig-zag diagonal groove with said circumferential grooves being opposite said rib recesses.

2. A resilient highway truck tire comprising a molded tire body having tire beads, adjoining sidewalls and alternate diagonal cord plies in said body, a pair of zig-zag grooves in said tread extending circumferentially around said tire and spaced inwardly from the outer edge thereof to form outer ribs, said circumferential zig-zag grooves being formed of a plurality of straight-walled angularly intersecting groove segments, every other one of which is at an angle of about 25° from the center line of said tread and the remaining groove segments being substantially coincident with the top diagonal layer of said cord plies, the groove segments in each circumferential groove intersecting each other in a series of outwardly and inwardly facing angles, a plurality of spaced diagonal zig-zag grooves intersecting at one end with the apex of each outwardly facing angle of said circumferential grooves and extending substantially coincident with the angle of said top-cord ply, said diagonal zig-zag grooves being formed of a plurality of straight-walled angularly intersecting groove segments terminating in a straight wall spaced from, parallel to and alternating on each side of the center line of said tread to form a circumferential central rib, said adjacent diagonal grooves defining therebetween a series of diagonal lug members extending from said central rib, each lug member on one side of said central rib having its base opposite the diagonal zig-zag groove between two lug members on the other side of said central rib.

References Cited in the file of this patent

UNITED STATES PATENTS

| D. 58,218 | Culp | Jan. 28, 1921 |
| D. 71,084 | Sears | Sept. 14, 1926 |
| D. 190,012 | Wolfer | Mar. 28, 1961 |
| 1,013,085 | Whitlock | Dec. 26, 1911 |
| 2,310,776 | Gay | Feb. 9, 1943 |
| 2,592,557 | Gibbs | Apr. 15, 1952 |
| 2,850,066 | Nellen | Sept. 2, 1958 |